United States Patent [19]

Kolb

[11] 4,394,209
[45] Jul. 19, 1983

[54] ARRANGEMENT FOR AFFIXING THE BOTTOM OF A THERMOPLASTIC CONTAINER

[75] Inventor: Dieter Kolb, Tuebingen, Fed. Rep. of Germany

[73] Assignee: Christian Majer GmbH & Co. KG., Tuebingen, Fed. Rep. of Germany

[21] Appl. No.: 360,883

[22] Filed: Mar. 22, 1982

[30] Foreign Application Priority Data

Mar. 25, 1981 [DE] Fed. Rep. of Germany ....... 8108746

[51] Int. Cl.³ ...................... B29C 27/08; B32B 31/16
[52] U.S. Cl. .................................. 156/580.1; 156/69; 156/73.1; 156/580.2; 228/1 R; 493/108; 493/156
[58] Field of Search ................. 156/580.1, 580.2, 73.1, 156/69; 228/1 R; 264/23; 425/174.2; 493/108, 133, 156

[56] References Cited

U.S. PATENT DOCUMENTS

| | | | |
|---|---|---|---|
| 3,429,028 | 2/1969 | Maropis et al. | 228/1 |
| 3,438,824 | 4/1969 | Balamuth | 156/73.1 |
| 3,456,564 | 7/1969 | McCandless | 156/69 |
| 3,604,320 | 9/1971 | Duvall et al. | 493/133 |
| 4,187,768 | 2/1980 | Suzuki | 156/580.1 |
| 4,226,652 | 10/1980 | Berg | 156/69 |

Primary Examiner—Michael G. Wityshyn

[57] ABSTRACT

An improved arrangement for weldingly connecting an annular connecting edge of a synthetic thermoplastic bottom to a cylindrical thermoplastic section to form a cylindrical container having one open end and one end which is closed by the bottom. The arrangement includes a supporting frame having a pair of confronting vertical wall portions. A first disc is rotatably mounted via a first shaft in a first vertical wall portion. A second hollow shaft is coaxially slidably and freely rotatably mounted with respect to the first shaft in a second confronting vertical wall. A counter pressure second disc is coaxially slidably freely rotatably mounted in the second hollow shaft. The thermoplastic bottom is adapted to be clampingly held between the first and second discs. At least one freely rotatable anvil roller is mounted on the second hollow shaft for engaging the connecting edge of the thermoplastic bottom or the inside wall of the cylindrical thermoplastic section. An ultrasonic welding device having a welding head is mounted on the machine frame and is adapted to weld the connecting edge to the thermoplastic cylindrical section.

7 Claims, 2 Drawing Figures

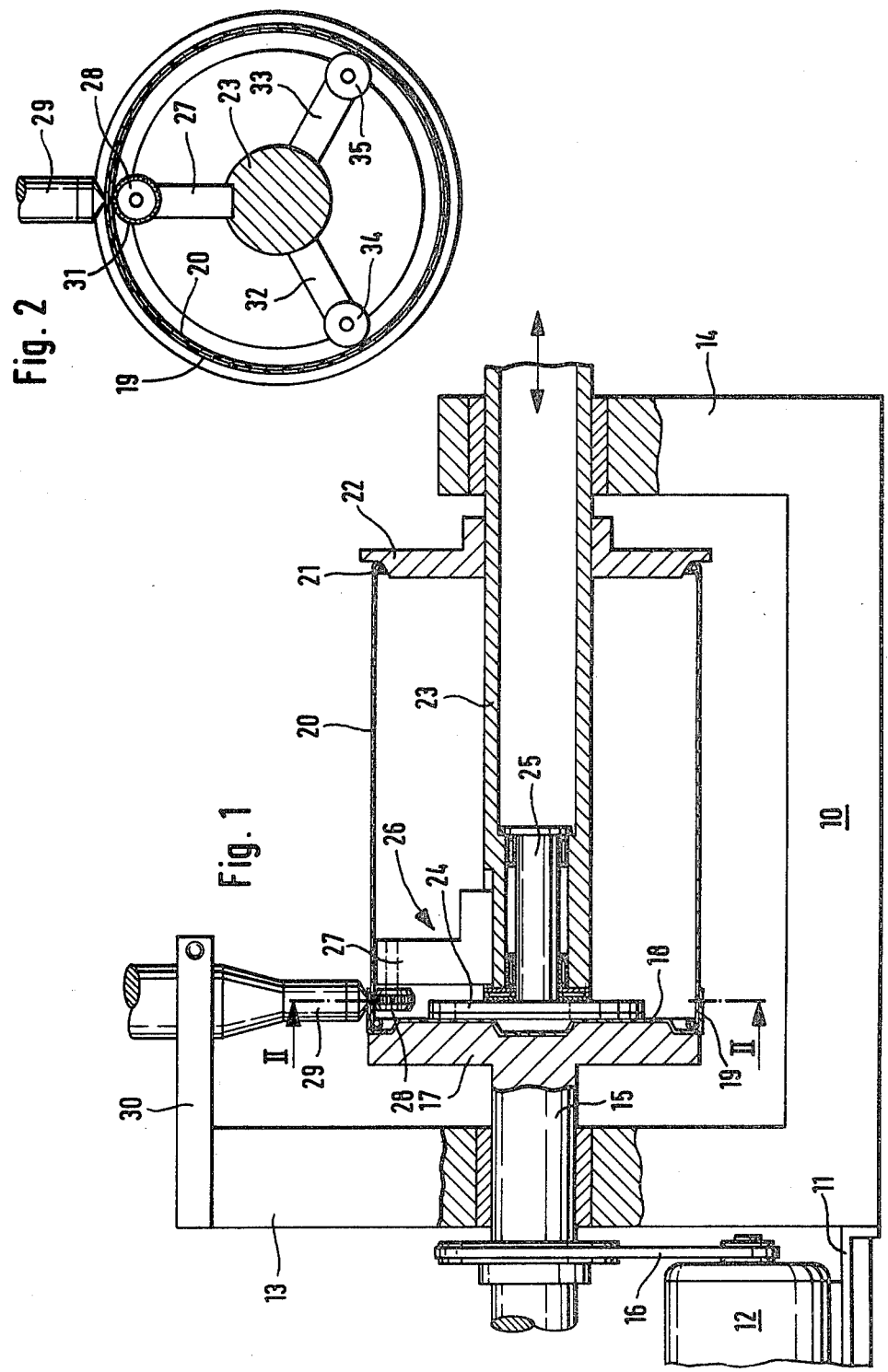

ARRANGEMENT FOR AFFIXING THE BOTTOM OF A THERMOPLASTIC CONTAINER

BACKGROUND OF THE INVENTION

The invention relates to an arrangement for affixing a bottom in a cylindrically shaped container made of thermoplastic synthetic material, which bottom has an edge portion adapted to be inserted or fastened onto the cylindrical container. The bottom is also made of thermoplastic material and is affixed by means of a rotatably mounted counter pressure member which coacts with a sonotrode (ultrasonic welding maching) which acts as a welding head. It is already known to effect welding connections by means of ultrasonic-welding heads acting on thermoplastic objects. It is an object of this invention to provide an arrangement which permits to carry out such a welding process for affixing an insertable bottom having a connecting edge onto a thin-walled cylindrical container having little or no inherent rigidity without deforming this container while nevertheless attaining a fluid-tight connection.

SUMMARY OF THE INVENTION

The afore-described object is obtained by an arrangement of the afore-described type in accordance with the invention. The novel arrangement includes a rotatable disc which engages with the container bottom and a coaxially adjustably mounted counter pressure member which includes at least one freely rotatably mounted counter pressure body which engages the other side of the container bottom. The counter pressure member includes an anvil roller for coaction with the sonotrode (ultrasonic welding device). This counter pressure member can advantageously have a plurality of support rollers which are advantageously mounted so as to be uniformly peripherally spaced about the counter pressure member to coact with the anvil roller and engage at the inner side of the container or at the insertable bottom edge. By means of such measures there is achieved a secure guiding and holding of the supporting container and insertable bottom for achieving an exact welding connection without deforming the container.

The counter pressure member can have as the counter pressure body a freely rotatably mounted counter pressure disc which is arranged coaxially with respect to the driven rotating disc. Advantageously the anvil rollers can have a ridged or toothed surface so that a non-uniform welded seam results which favors the strength properties thereof but nevertheless is fluid tight.

Advantageously there can be mounted on an axially adjustable shaft supporting the counter pressure body an additional rotatable supporting disc for supporting the edge of the opening of the to be worked cylindrical container which is remote from the bottom, so that a support of the container is achieved not only in the region of the bottom connection but also in the region of the opening of the container remote therefrom. The sonotrode (accoustical welding device) can be mounted on a stationary member or can also be adjustably mounted in the longitudinal direction of the container jointly with the counter pressure part and the anvil part, so that with a fixed container there can also be formed a longitudinal seam.

BRIEF DESCRIPTION OF THE DRAWING

With these and other objects in view which will become apparent in the following detailed description, the present invention, which is shown only by example, will be clearly understood in connection with the accompanying drawing, in which:

FIG. 1 is a side elevational view which illustrates very schematically the arrangement substantially in an axial longitudinal sectional view; and FIG. 2 is a schematic partial lateral cross section through the arrangement along line II—II of FIG. 1.

DETAILED DESCRIPTION

In a stationary machine frame 10 there is laterally secured a platform 11 for rigidly supporting a drive motor 12 thereon. A drive shaft 15 is rotatably mounted in a vertial wall 13 of the machine frame 10 and this drive shaft is driven by means of the drive motor 12 via a drive belt 16. The drive shaft 15 is formed at its right side by a rotatable disc 17. The front end of the rotatable disc 17 is shaped so as to correspond to the exterior periphery of a container bottom 18, so that the round container bottom 18 having an annular ring-shaped insertable edge 19 can be mounted concentrically on the rotatable disc 17.

As can be noted from the sectional view of FIG. 1 the container bottom 18 with its ring-shaped insertable edge 19 can be mounted on one end of a thin-walled thermoplastic synthetic foil cylindrical section which is then finished into a cylindrical container 20. At the opening at the other end of the container 20, remote from the bottom, there is formed an inwardly flanged edge 21 which is supported by a supporting disc 22 so that the container 20 itself is supported by the supporting disc 22. This supporting disc 22 is slidably movable and freely rotatably mounted on a hollow shaft 23 which is rotatable in a vertical wall 14 of the machine frame 10. At the forward end of the hollow shaft 23 there is coaxially mounted a counter pressure disc 24 of a counter pressure member which is generally designated with a reference number 26 and which is provided with a mandrel 25 freely rotatable in the hollow shaft. In the operative position of the hollow shaft 23, as illustrated in the drawing, the counter pressure disc 24 concentrically abuts against the inner side of the bottom 18.

The counter pressure member 26 also includes at least one radial arm 27 which is mounted on the hollow shaft 23 and at the free end of which there is provided an anvil roller 28 freely rotatably mounted thereon. This anvil roller 28 coacts with a welding head in the form of a sonotrode (ultrasonic welding device), so that it acts from the interior against the inserting edge 19 of the container bottom 18. The sonotrode is slid onto the cylindrical container 20 and is supported by a supporting arm 30 mounted on the vertical wall 13 of the machine frame 10.

As can be noted from the cross-sectional view of FIG. 2, the anvil roller 28 has a serrated or grooved peripheral surface 31. Additionally, there are provided on the hollow shaft 23 at uniform distances from the radial arm 27 two additional radial arms 32 and 33 which have at their free ends corresponding freely rotatably mounted pressure rollers 34 and 35 which act against the inner side of the wall of the container 20. The support rollers 34 and 35 are not illustrated and cannot be seen in FIG. 1.

The container 20 mounted in the arrangement with its inset bottom 18 is rotated by the drive motor 12 whereby the rotational movement of the rotating disc 17 is transferred onto the bottom of container 20 via the matingly abutting container bottom 18. During the rotational movement there is formed between the anvil roller 28 and the sonotrode 29 a welding seam, by means of which the inserted edge 19 of the bottom is joined with the end region of the cylindrical container 20. During this welding process the cylindrical container 20 is supported by means of the supporting disc 22 and the support rollers 34 and 35. After completion of the ridged welding seam the hollow rod 23 with the counter pressure part 26 is moved towards the right until the counter pressure part 26 is located in the vicinity of the vertical wall 14 of the frame 10 of the arrangement. In this position the cylindrical container 20 with the inserted and welded bottom 18 can be removed from the arrangement and a new cylindrical container with an already inserted but not yet welded bottom 18 can be mounted into the arrangement before the counter pressure part 26 is again moved in an axial direction until it bears against the counter pressure disc 24 which bears against the container bottom 18.

The arrangement in accordance with the invention can be adapted to insert bottoms of different sizes. The insertable edge 19 of the bottom 18 can also be made to bear against the inner wall of the container 20. Moreover, the container bottom 18 can be arranged and mounted deeper inside the container 20 in which case the anvil roller 28 must be inserted from outside into the free bottom region of the container. The position of the sonotrode 29 and anvil roller 28 can be reversed.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

I claim:

1. An improved arrangement for weldingly connecting a cylindrical synthetic thermoplastic container to a bottom also of synthetic thermoplastic material having an annular connecting edge portion integral therewith, the improvement comprising in combination, a machine frame;

counter pressure means rotatably and axially adjustably mounted in said machine frame;

ultrasonic welding means operatively mounted on said machine frame and adapted to coact with said counter pressure means;

a first disc rotatably mounted in said machine frame coaxially with respect to said counter pressure means;

a drive motor operatively connected to said first disc for drivingly rotating it;

said counter pressure means comprising at least one freely rotatably mounted anvil roller which is adapted to counter-pressure the connecting edge of the bottom or inside the container towards said ultrasonic welding means.

2. The improved arrangement for connecting a cylindrical synthetic thermoplastic container to a bottom as set forth in claim 1, wherein said counter pressure means includes two additional freely rotatable rollers which are uniformly angularly spaced from said anvil roller and are adapted to engage the inside of the container or the connecting edge of the bottom.

3. The improved arrangement for connecting a cylindrical synthetic thermoplastic container to a bottom as set forth in claim 2, wherein said counter pressure means includes a counter pressure disc which is coaxially freely rotatably mounted relative to said first disc; a hollow shaft coaxially slidably movably mounted in said machine frame relative to said first disc, said counter pressure disc being axially slidably and freely rotatably mounted in said hollow shaft.

4. The improved arrangement for connecting a cylindrical synthetic thermoplastic container to a bottom as set forth in claim 3, wherein said anvil roller has a ridged or serrated peripheral surface.

5. The improved arrangement for connecting a cylindrical synthetic thermoplastic container to a bottom as set forth in claim 4, including an additional second supporting disc rotatably coaxially mounted on said hollow shaft for supporting the open end of the cylindrical container which is remote from the bottom.

6. The improved arrangement for connecting a cylindrical synthetic thermoplastic container to a bottom as set forth in claim 5, wherein said ultrasonic welding means, said counter pressure means and said anvil roller are adjustably movable in said machine frame along the longitudinal direction of said container for effecting a longitudinal welding seam.

7. The improved arrangement for connecting a cylindrical synthetic thermoplastic container to a bottom as set forth in claim 1, wherein said connecting edge portion is welded to the inside of said container.

* * * * *